(12) United States Patent
Irun-Briz et al.

(10) Patent No.: US 12,438,748 B2
(45) Date of Patent: Oct. 7, 2025

(54) CAPACITY-AWARE LOCAL REPAIR OF TUNNELS IN WIDE AREA NETWORKS

(71) Applicant: Microsoft Technology Licensing, LLC, Redmond, WA (US)

(72) Inventors: Luis Irun-Briz, Sammamish, WA (US); Umesh Krishnaswamy, San Jose, CA (US); Himanshu Raj, Cupertino, CA (US); Paul David Mattes, Saint Paul, MN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 18/320,944

(22) Filed: May 19, 2023

(65) Prior Publication Data
US 2024/0388469 A1    Nov. 21, 2024

(51) Int. Cl.
| | | |
|---|---|---|
| *G06F 15/173* | (2006.01) | |
| *H04L 12/46* | (2006.01) | |
| *H04L 41/0816* | (2022.01) | |
| *H04L 45/00* | (2022.01) | |
| *H04L 47/125* | (2022.01) | |

(52) U.S. Cl.
CPC ...... *H04L 12/4633* (2013.01); *H04L 41/0816* (2013.01); *H04L 45/22* (2013.01); *H04L 47/125* (2013.01)

(58) Field of Classification Search
CPC . H04L 12/4633; H04L 41/0816; H04L 45/22; H04L 47/125
See application file for complete search history.

(56) References Cited

U.S. PATENT DOCUMENTS

| | | | |
|---|---|---|---|
| 9,065,750 B2* | 6/2015 | Vasseur | H04L 45/22 |
| 9,253,097 B1* | 2/2016 | Barman | H04L 47/122 |
| 2007/0183317 A1* | 8/2007 | Vasseur | H04L 45/28 |
| | | | 370/225 |

(Continued)

OTHER PUBLICATIONS

Bhatia, et al., "Bidirectional Forwarding Detection (BFD) on Link Aggregation Group (LAG) Interfaces", Retrieved From: https://www.muonics.com/rfc/rfc7130.php, Feb. 2014, 11 Pages.

(Continued)

*Primary Examiner* — Joseph R Maniwang
(74) *Attorney, Agent, or Firm* — Foley IP Law, PLLC

(57) ABSTRACT

Solutions are disclosed that enable capacity-aware local repair of tunnels in packet switched wide area networks (WANs). Traffic engineering agents on the routers are programmed to create the tunnels and include sets of primary and alternate tunnels sharing the same source and destination. A tunnel source router is provided a traffic split for allocating incoming traffic to its primary and alternate tunnels for when the primary tunnel is operating at or near full capacity operation, and another traffic split that shifts at least some traffic from the primary tunnel to the alternate tunnel, when the primary tunnel's capacity drops below a threshold. A tunnel may lose capacity for commonly-occurring reasons, such as a disturbance to cabling and faults in optical transceivers. Traffic engineering agents along the tunnel report capacity to the tunnel source router, permitting the network to respond to capacity changes more rapidly than waiting for network tunnel reconfiguration.

20 Claims, 12 Drawing Sheets

(56) References Cited

U.S. PATENT DOCUMENTS

| | | | |
|---|---|---|---|
| 2010/0002578 A1* | 1/2010 | Fiorone | H04L 45/00 370/228 |
| 2023/0261980 A1* | 8/2023 | Padi | H04L 45/28 370/225 |
| 2023/0370363 A1* | 11/2023 | Padi | H04L 45/125 |
| 2024/0243995 A1* | 7/2024 | Vasseur | H04L 45/36 |

OTHER PUBLICATIONS

International Search Report and Written Opinion received for PCT Application No. PCT/US2024/028453, Sep. 9, 2024, 13 pages.

\* cited by examiner

CAPACITY-AWARE LOCAL REPAIR OF TUNNELS IN WIDE AREA NETWORKS

BACKGROUND

In large wide area networks (WANs), data flows between source and destination regions may use pre-defined paths often referred to as tunnels. The set of tunnels has a known topology and capacity, permitting intelligent traffic management, and each tunnel is created by programming labeled routes into routers within a WAN. The set of tunnels in a WAN may be refreshed on some interval, in order to optimize WAN traffic capacity in response to changing traffic patterns and/or hardware outages or other physical changes.

Connections between routers, which are carried on fiber optic cables, may use link aggregation groups (LAGs) to transmit multiple channels in parallel along a single fiber. When a fiber optic cable is physically disturbed, such as by being bent, its data-carrying capacity may be reduced, changing the capacity of the tunnel that passes through it. Such reductions in data-carrying capacity may occur (and may even be corrected) in a time span that is shorter than the interval on which the set of tunnels is refreshed. In such scenarios, the traffic capacity is no longer optimal for the remainder of the time for which the current set of tunnels is to be used. This negatively impacts overall WAN performance.

SUMMARY

The disclosed examples are described in detail below with reference to the accompanying drawing figures listed below. The following summary is provided to illustrate some examples disclosed herein.

Example solutions for capacity-aware local repair of tunnels in wide area networks (WANs) include: creating, in a packet switched network (e.g., a WAN), a first primary tunnel comprising: a tunnel source router, a tunnel destination router, and a first mid-tunnel router disposed between the tunnel source router and the tunnel destination router; creating, in the packet switched network, a first alternate tunnel comprising: the tunnel source router, the tunnel destination router, and a second mid-tunnel router disposed between the tunnel source router and the tunnel destination router, wherein the second mid-tunnel router is not within the first primary tunnel; determining, by the first mid-tunnel router, a capacity of the first primary tunnel between the first mid-tunnel router and a first subsequent router of the first primary tunnel, wherein the first subsequent router of the first primary tunnel is not within the first alternate tunnel; comparing the capacity of the first primary tunnel between the first mid-tunnel router and the first subsequent router of the first primary tunnel with a first capacity threshold; and based on at least the capacity of the first primary tunnel between the first mid-tunnel router and the first subsequent router of the first primary tunnel dropping below the first capacity threshold, transferring at least a portion of traffic for the first primary tunnel to the first alternate tunnel.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
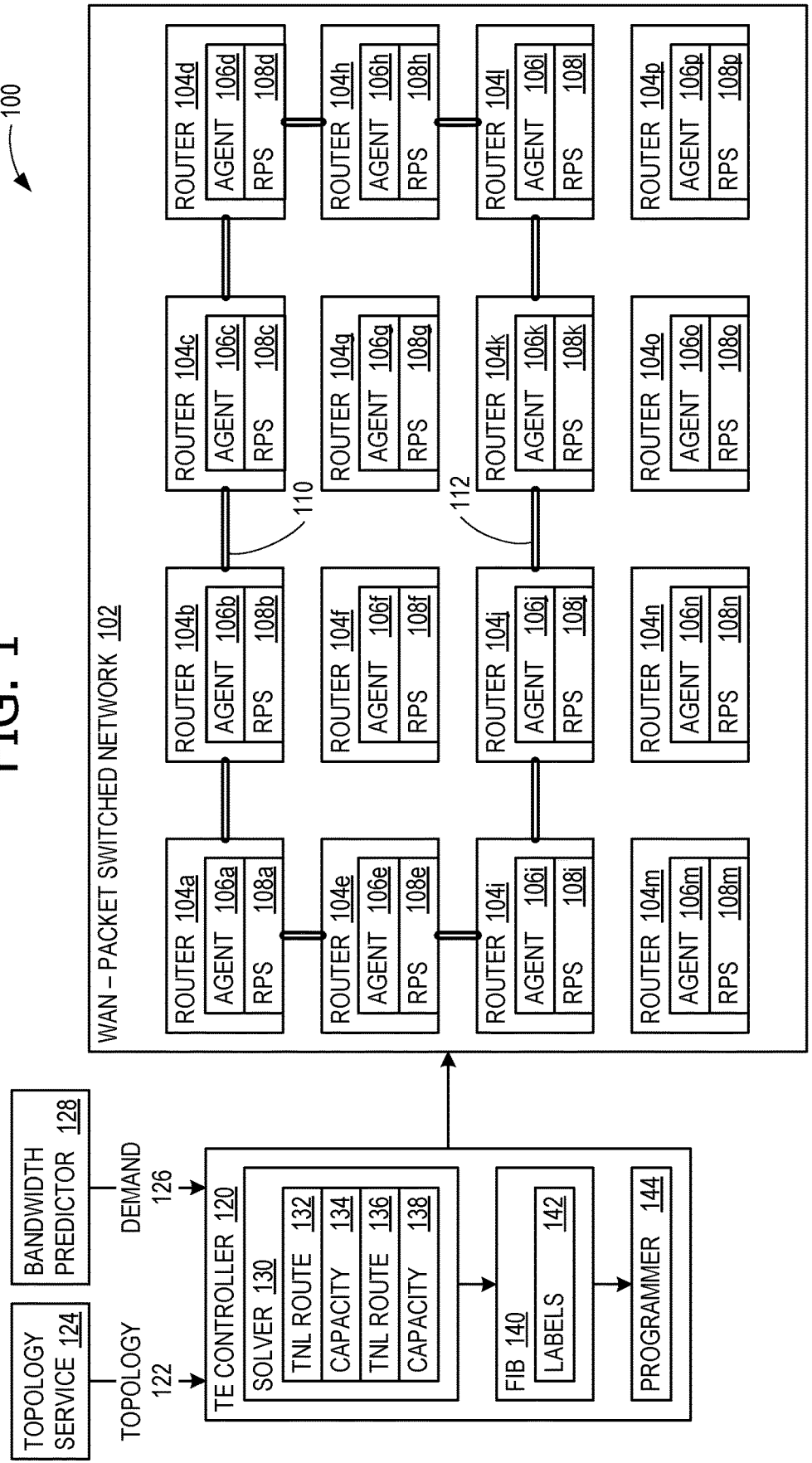
FIG. 1 illustrates an example wide area network (WAN) architecture that advantageously provides capacity-aware local repair of tunnels.

A packet switched wide area network (WAN) may provide for data flows between different regions, such as geographically-dispersed data centers, carrying data traffic among sets of servers using tunnels. Changes to network traffic capacity are common, and are typically handled by reconfiguring the tunnels on some schedule. However, the recurrence of tunnel reconfiguration is limited by the computational burden of optimizing traffic capacity on large networks with a significant number of routers.

Unfortunately, some losses to network capacity between routers are common and may occur more rapidly than the interval between tunnel reconfigurations, and may occur in a large number of possible locations. Examples include physical disturbances to fiber optic cables between routers in the middle of a tunnel, and faults in optical transceivers of individual links. In order to preserve network traffic capacity during the intervals between tunnel reconfigurations, a more time-responsive capacity-aware local repair capability is needed, that does not wait until the next tunnel reconfiguration to re-route traffic.

Aspects of the disclosure enable capacity-aware local repair of tunnels in packet switched WANs. Traffic engineering agents on the routers are programmed to create the tunnels, and include sets of primary and alternate tunnels that share the same source and destination. A tunnel source router is provided a traffic split for allocating incoming traffic to its primary and alternate tunnels for when the primary tunnel is operating at or near full capacity operation, and also another traffic split that shifts at least some traffic from the primary tunnel to the alternate tunnel, when the primary tunnels capacity drops below a specified capacity threshold. Traffic engineering agents along the tunnel report capacity to the tunnel source router. This permits the network to respond to capacity changes more rapidly than waiting until a network tunnel reconfiguration event.

The example solutions described herein improve the responsiveness of WANs by improving the speed and reliability of data traffic flows in the face of common and rapidly occurring drops in tunnel capacity. This has the benefit of enabling a higher amount of data traffic to flow on a WAN with a given number of routers, or reducing the number of routers while preserving a data traffic capacity. This is accomplished by, at least, based on at least the capacity of a primary tunnel between a mid-tunnel router and the subsequent router of the primary tunnel dropping below a capacity threshold, transferring at least a portion of traffic for the primary tunnel to an alternate tunnel.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example architecture 100 that advantageously provides capacity-aware local repair of tunnels for a packet switched network 102. In some examples, packet switched network 102 comprises a WAN, although the techniques disclosed herein may apply to other classes of packet switched networks. In architecture 100, packet switched network 102 carries data, such as for example, replications data (for crash recovery) from one data center to another data center, possibly in a different geographical region.

Packet switched network 102 has a set of routers 104a-104p that route the data across cabling (see FIG. 4) and other forms of data conveyance. Each of routers 104a-104p has its own traffic engineering agent, one of traffic engineering agents 106a-106p, and a routing protocol service (RPS), one of routing protocol services 108a-108p. A traffic engineering controller 120 programs traffic engineering agents 106a-106p at routers 104a-104p to create tunnels. A primary tunnel 110 and an alternate tunnel 112 are shown.

Primary tunnel 110 passes from router 104a, which is the tunnel source router for primary tunnel 110, through router 104b and router 104c to router 104d. Router 104d is the tunnel destination router for primary tunnel 110. Router 104a has traffic engineering agent 106a and routing protocol service 108a, router 104b has traffic engineering agent 106b and routing protocol service 108b, router 104c has traffic engineering agent 106c and routing protocol service 108c, and router 104d has traffic engineering agent 106d and routing protocol service 108d. Routers 104b and 104c are mid-tunnel routers.

Alternate tunnel 112 also passes from router 104a, which is the tunnel source router for both primary tunnel 110 and alternate tunnel 112, to router 104d, which is the tunnel destination router for both primary tunnel 110 and alternate tunnel 112. However, alternate tunnel 112 takes a different route, having at least one router not in common with primary tunnel 110, such that at least one router within primary tunnel 110 is not within alternate tunnel 112, and at least one router within alternate tunnel 112 is not within primary tunnel 110.

As shown, alternate tunnel 112 passes from router 104a, through router 104e, router 104i, router 104j, router 104k, router 104l, and router 104h, to router 104d. Router 104e has traffic engineering agent 106e and routing protocol service 108e, router 104i has traffic engineering agent 106i and routing protocol service 108i, router 104j has traffic engineering agent 106j and routing protocol service 108j, router 104k has traffic engineering agent 106k and routing protocol service 108k, router 104l has traffic engineering agent 106l and routing protocol service 108l, and router 104h has traffic engineering agent 106h and routing protocol service 108h. Routers 104e, 104i, 104j, 104k, 104l, and 104h are mid-tunnel routers.

Traffic engineering controller 120 receives network topology 122 from a topology service 124 that collects information regarding the performance of data paths within packet switched network 102 on an ongoing basis, and network demand 126 from a bandwidth predictor 128 that makes predictions about expected data flow paths and amounts. On some schedule, a tunnel reconfiguration trigger event prompts a traffic engineering solver 130 to determine a set of tunnels for packet switched network 102 to replace the existing set of tunnels. Traffic engineering solver 130 performs this as an optimization problem, seeking to optimize traffic-carrying capacity for the expected demand, as indicated by network demand 126. The new set of tunnels may have some tunnels in common with the set to be replaced. The common tunnels remain in place, the new tunnels are added, and the tunnels not in the new set are removed.

Figure 3:
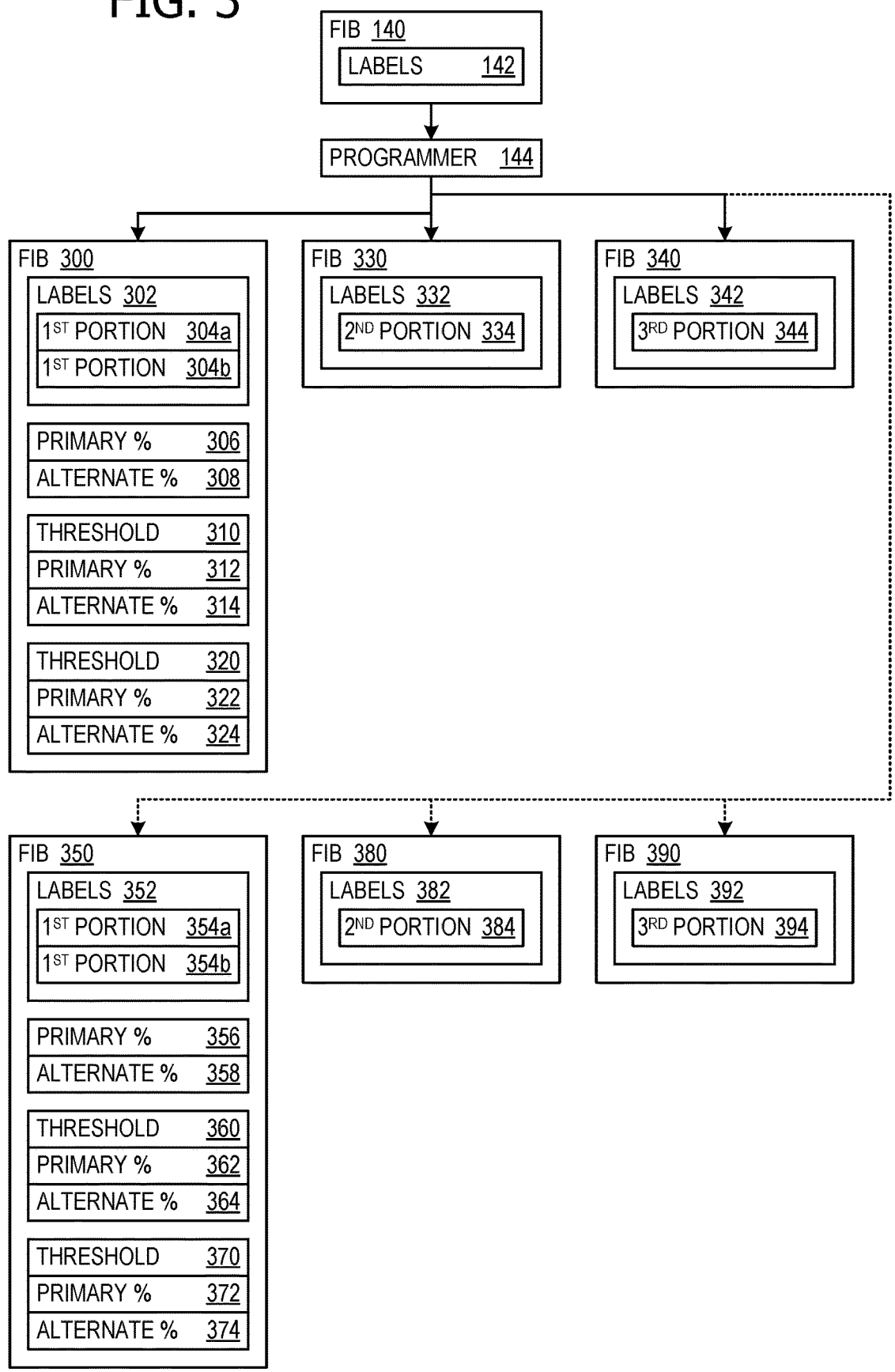
FIG. 3 illustrates exemplary data used to program network tunnels, such as may be used in the example architecture of FIG. 1.

Although traffic engineering solver 130 is illustrated as being within traffic engineering controller 120, traffic engineering solver 130 may be a separate component, in some examples. Traffic engineering solver 130 is illustrated as having solved for the current set of tunnels, primary tunnel 110 and alternate tunnel 112. Traffic engineering solver 130 has a route 132 of primary tunnel 110, a capacity 134 of primary tunnel 110, a route 136 of alternate tunnel 112, and a capacity 138 of alternate tunnel 112. Traffic engineering solver 130 places these into a forwarding information base (FIB) 140 that has a set of path labels 142 for the tunnels. Additionally, traffic engineering solver 130, or another component of traffic engineering controller 120 determines capacity thresholds and traffic rerouting split ratios for the capacity-aware local repair described below. Additional detail is shown in FIG. 3. Although only two tunnels are shown, it should be understood that some examples may have a larger number, such as thousands of tunnels.

A router programmer 144 separates FIB 140 into specific FIBs for each router (which is shown in further detail in FIG. 3), and transmits the router-specific FIBs to the select ones of routers 104a-104p. This programs the traffic engineering agents at the routers to create the tunnels. For example, traffic engineering agent 106a is programmed for the initial jumps of primary tunnel 110 and alternate tunnel 112, to router 104b and router 104e, respectively. Traffic engineering agent 106b is programmed for the next hop of primary tunnel 110 to router 104c, and traffic engineering agent 106c is programmed for the final hop of primary tunnel 110 to router 104d.

Similarly, each of traffic engineering agent 106a, 106e-106l, and 106h is programmed for the hop to the next subsequent router of alternate tunnel 112. Traffic engineering agent 106d does not require programming for either primary tunnel 110 or alternate tunnel 112, because it receives packets and does not need to forward the packets further along either of primary tunnel 110 or alternate tunnel 112. The programming assigns labels to routers, so for example, when traffic engineering agent 106i encounters a label for alternate tunnel 112, it translates the label into the address of router 104j, and when traffic engineering agent 106j encounters the same label for alternate tunnel 112, it translates the label into the address of router 104k.

Figure 2:
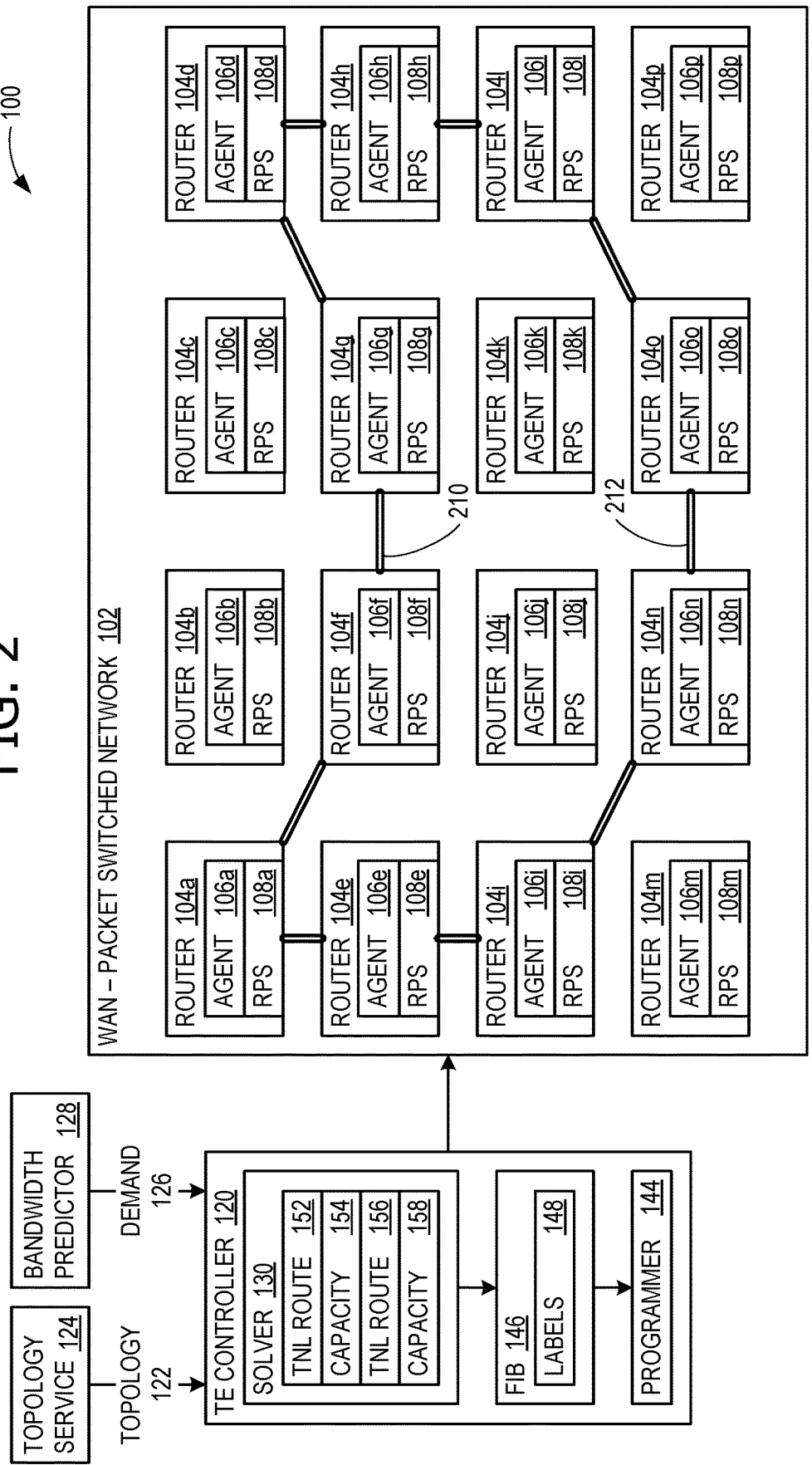
FIG. 2 illustrates the example architecture of FIG. 1 after network tunnels have been replaced.

FIG. 2 illustrates architecture 100 after network tunnels have been replaced. A new primary tunnel 210 replaces the former primary tunnel 110, and a new alternate tunnel 212 replaces the former alternate tunnel 112. Although entirely different routes are shown in order to provide contrast between primary tunnels 110 and 210 and alternate tunnels 112 and 212, in some examples, new tunnels may be duplicates of the former tunnels.

Traffic engineering solver 130 is illustrated in FIG. 2 as having solved for the new replacement set of tunnels, primary tunnel 210 and alternate tunnel 212. Traffic engineering solver 130 has a route 152 of primary tunnel 210, a capacity 154 of primary tunnel 210, a route 156 of alternate tunnel 212, and a capacity 158 of alternate tunnel 112. Traffic engineering solver 130 places these into an FIB 146 that has a set of path labels 148 for the tunnels.

Primary tunnel 210 passes from router 104*a*, through router 104*f* and router 104*g* to router 104*d*. Router 104*f* has traffic engineering agent 106*f* and routing protocol service 108*f*, and router 104*g* has traffic engineering agent 106*g* and routing protocol service 108*g*. Alternate tunnel 212 also passes from router 104*a*, which is the tunnel source router for both primary tunnel 210 and alternate tunnel 212, to router 104*d*, which is the tunnel destination router for both primary tunnel 210 and alternate tunnel 212. Routers 104*f* and 104*g* are mid-tunnel routers.

As shown, alternate tunnel 212 passes from router 104*a*, through router 104*e*, router 104*i*, router 104*n*, router 104*o*, router 104*l*, and router 104*h*, to router 104*d*. Router 104*e* has traffic engineering agent 106*e* and routing protocol service 108*e*, router 104*i* has traffic engineering agent 106*i* and routing protocol service 108*i*, router 104*n* has traffic engineering agent 106*n* and routing protocol service 108*n*, router 104*o* has traffic engineering agent 106*o* and routing protocol service 108*o*, router 104*l* has traffic engineering agent 106*l* and routing protocol service 108*l*, router 104*h* has traffic engineering agent 106*h* and routing protocol service 108*h*. Routers 104*e*, 104*i*, 104*n*, 104*o*, 104*l*, and 104*h* are mid-tunnel routers in the alternate tunnel 212.

Routers 104*m* and 104*p* were not in any tunnels. Router 104*m* has traffic engineering agent 106*m* and routing protocol service 108*m*, and router 104*p* has traffic engineering agent 106*p* and routing protocol service 108*p*.

Router programmer 144 separates FIB 146 into specific FIBs for each router (which is shown in further detail in FIG. 3), and transmits the router-specific FIBs to the select ones of routers 104*a*-104*p*. This programs the traffic engineering agents at the routers to create primary tunnel 210 and alternate tunnel 212.

FIG. 3 illustrates the breakup of FIB 140, with labels 142 into router-specific FIBs. A FIB 300 is used to program traffic engineering agent 106*a* of router 104*a* for primary tunnel 110 and alternate tunnel 112, a FIB 330 is used to program traffic engineering agent 106*b* of router 104*b* for primary tunnel 110, a FIB 340 is used to program traffic engineering agent 106*c* of router 104*c* for alternate tunnel 112. Other router-specific FIBs (not shown) are also generated from FIB 140 to program the traffic engineering agents within the routers of alternate tunnel 112. Additionally, a dashed line is shown from router programmer 144 to router specific FIBs 350, 380, and 390 for when router programmer 144 breaks up FIB 146.

FIB 300 has labels 302 for the initial hops of primary tunnel 110 and alternate tunnel 112 to routers 104*b* and 104*e*, respectively. A first portion 304*a* is the first portion of the route of primary tunnel 110 (router 104*a* to router 104*b*), and a first portion 304*b* is the first portion of the route of alternate tunnel 112 (router 104*a* to router 104*e*). Similarly, FIB 330 has labels 332 for the second hop of primary tunnel 110, indicated by a second portion 334 for the next hop of primary tunnel 110 (router 104*b* to router 104*c*). FIB 340 has labels 342 for the third and final hop of primary tunnel 110, indicated by a third portion 344 for the hop from router 104*c* to router 104*d*.

FIB 300 also has a primary percentage 306 indicating which percentage of the traffic coming into router 104*a* with a tunnel label should pass through primary tunnel 110 and an alternate percentage 308 indicating which percentage of the traffic coming into router 104*a* with a tunnel label should pass through alternate tunnel 112. This is the normal traffic split among primary tunnel 110 and alternate tunnel 112, to be used when primary tunnel 110 has sufficient capacity. In some examples, the sum of primary percentage 306 and alternate percentage 308 is 100 percent. In some examples, only primary percentages are specified, and the alternate percentage is inferred by subtracting the primary percentage from 100 percent. In some examples, primary percentages 312, 322 and alternative percentages 308, 314, 324 may be zero. In some examples, there may be multiple primary and alternate tunnels.

Figure 6A:
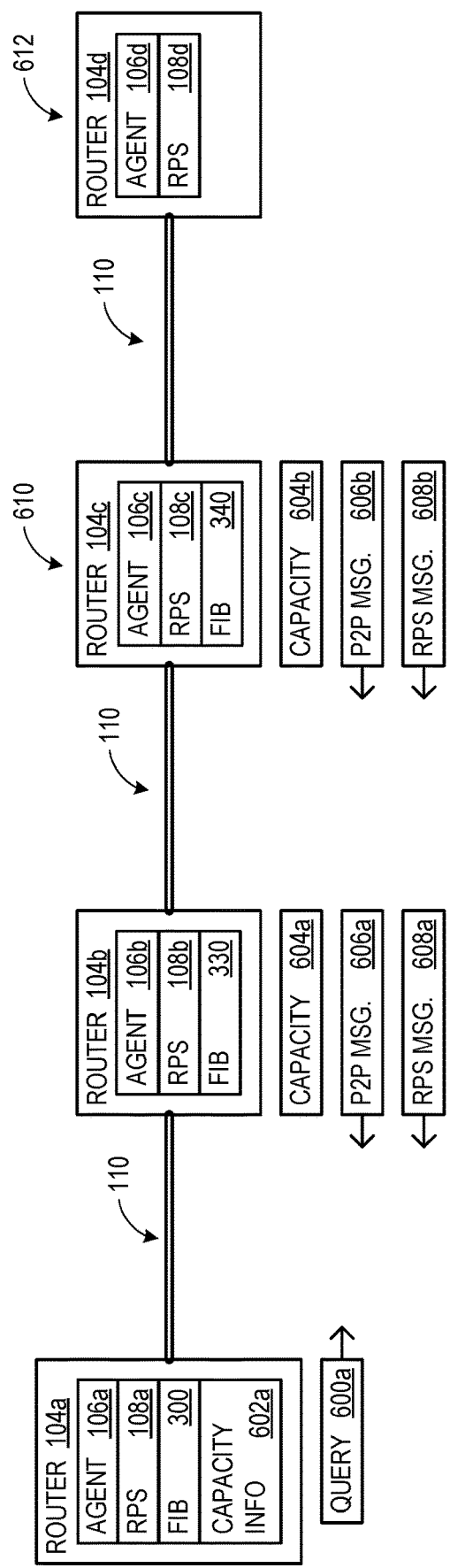
FIGS. 6A and 6B illustrate example communication among routers used within the example architecture of FIG. 1.
Figure 6B:
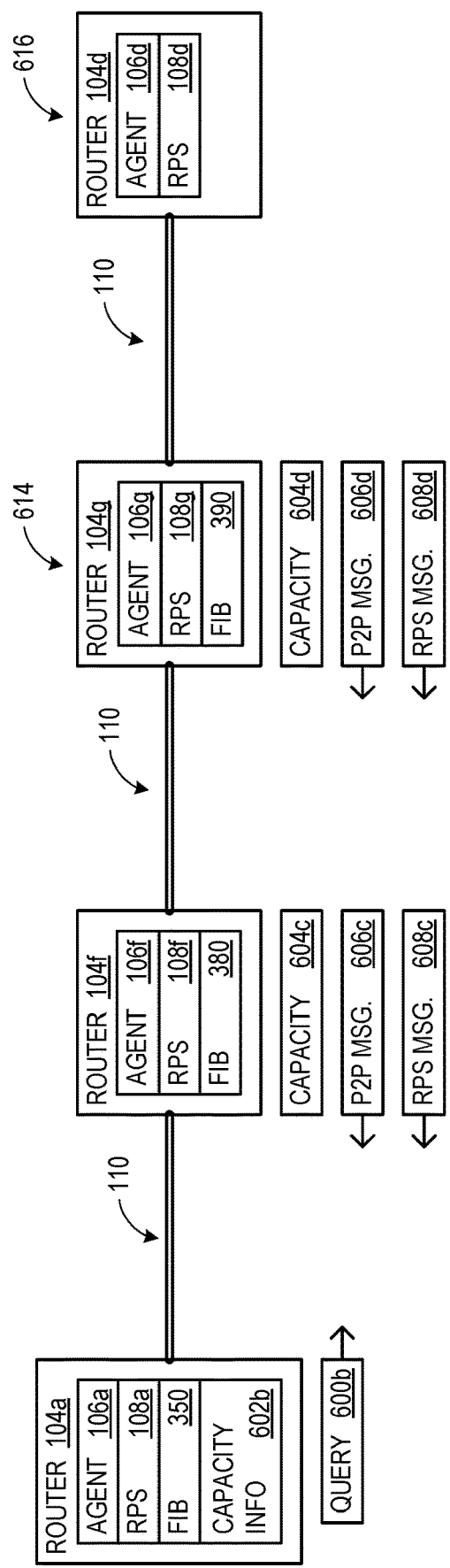

However, when traffic engineering agent 106*a* determines that the capacity of primary tunnel 110 has dropped, either by measurements of the tunnel capacity by router 104*a*, or by using capacity information reporting from other routers in primary tunnel 110 (i.e., routers 104*b* and 104*c*), traffic engineering agent 106*a* compares the measured capacity with a capacity threshold 310 and a capacity threshold 320. In some examples, only a single capacity threshold is used, in some examples, a different number of capacity thresholds are used. Reporting of capacity information from other routers in primary tunnel 110 is illustrated in FIGS. 6A and 6B.

If the capacity of primary tunnel 110 is above capacity threshold 310, primary percentage 306 and alternate percentage 308 are used. If the capacity of primary tunnel 110 is below capacity threshold 310 but above capacity threshold 320, a primary percentage 312 and an alternate percentage 314 are used. Primary percentage 312 is lower than primary percentage 306 and alternate percentage 314 is greater than alternate percentage 308, meaning that at least some data traffic is rerouted from primary tunnel 110 to alternate tunnel 112. If the capacity of primary tunnel 110 is below capacity threshold 320, a primary percentage 322 and an alternate percentage 324 are used. Primary percentage 322 is lower than primary percentage 312 and alternate percentage 324 is greater than alternate percentage 314, meaning that even more data traffic is rerouted from primary tunnel 110 to alternate tunnel 112 than when the capacity of primary tunnel 110 is above capacity threshold 320.

FIB 350 has labels 352 for the initial hops of primary tunnel 210 and alternate tunnel 212 to routers 104*f* and 104*e*, respectively. A first portion 354*a* is the first portion of the route of primary tunnel 210 (router 104*a* to router 104*f*), and a first portion 354*b* is the first portion of the route of alternate tunnel 212 (router 104*a* to router 104*e*). Similarly, FIB 380 has labels 382 for the second hop of primary tunnel 210, indicated by a second portion 384 for the next hop of primary tunnel 210 (router 104*f* to router 104*g*). FIB 390 has labels 392 for the third and final hop of primary tunnel 210, indicated by a third portion 394 for the hop from router 104*g* to router 104*d*.

FIB 350 also has a primary percentage 356 indicating which percentage of the traffic coming into router 104*a* with a tunnel label should pass through primary tunnel 210 and an alternate percentage 358 indicating which percentage of the traffic coming into router 104*a* with a tunnel label should pass through alternate tunnel 212. This is the normal traffic split among primary tunnel 210 and alternate tunnel 212, to be used when primary tunnel 210 has sufficient capacity. In some examples, the sum of primary percentage 356 and alternate percentage 358 is 100 percent.

However, when traffic engineering agent 106a determines that the capacity of primary tunnel 210 has dropped, either by measurements of the tunnel capacity by router 104a, or by using capacity information reporting from other routers in primary tunnel 210 (i.e., routers 104f and 104g), traffic engineering agent 106a compares the measured capacity with a capacity threshold 360 and a capacity threshold 370. If the capacity of primary tunnel 210 is above capacity threshold 360, primary percentage 356 and alternate percentage 358 are used. In some examples, capacity thresholds 360 and 370 are equal to capacity thresholds 310 and 320, respectively.

If the capacity of primary tunnel 210 is below capacity threshold 360 but above capacity threshold 370, a primary percentage 362 and an alternate percentage 364 are used. If the capacity of primary tunnel 210 is below capacity threshold 370, a primary percentage 372 and an alternate percentage 374 are used. Primary percentage 362 is lower than primary percentage 356, primary percentage 362 is lower than primary percentage 372, alternate percentage 364 is greater than alternate percentage 358, and alternate percentage 374 is greater than alternate percentage 364. This means that the greater the reduction in the capacity of primary tunnel 210, the more data traffic is rerouted from primary tunnel 210 to alternate tunnel 212.

Figure 4:
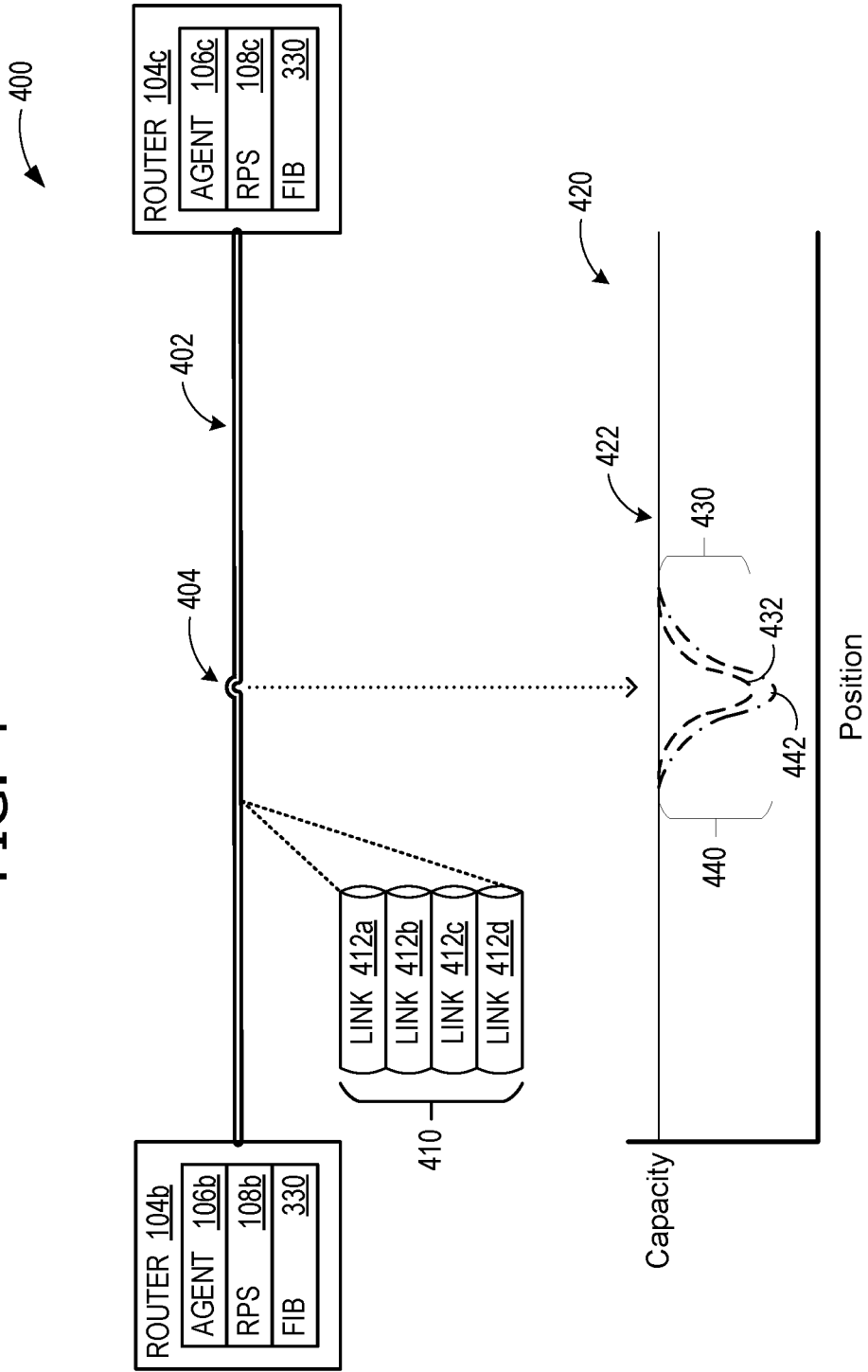
FIG. 4 illustrates an example physical disturbance of networking hardware and its effect, such as may occur in the example architecture of FIG. 1.

FIG. 4 illustrates an example damage scenario 400 in which a fiber optic cable 402 has a bend 404 that impacts the bandwidth carrying capacity. Damage scenario is shown as occurring between routers 104b and 104c, the second hop in primary tunnel 110. In some examples of packet switched network 102, data is carried between routers using a link aggregation group (LAG) over a fiber optic cable. An example LAG may have 16 members of 100 gigabits per second (Gbps). Each member is assigned a wavelength for a laser and sensor pair attached to the fiber optic cable. FIG. 4 shows an example LAG 410 comprising a link member 412a, a link member 412b, a link member 412c, and a link member 412d. Any link aggregation control protocol may be used to add, remove, or modify members of a LAG.

The data carrying capacity of fiber optic cable 402, which is the capacity of primary tunnel 110 between routers 104b and 104c, is the sum of the capacities of all members of LAG 410. The capacity of primary tunnel 110 is limited by the lowest capacity of any hop along the entirety of the tunnel.

Some physical disturbances to networking hardware, such as bend 404 in fiber optic cable 402 affect some frequencies more than others. For example, bend 404 results in some of the lower frequency (longer wavelength) light leaving fiber optic cable. This reduces the signal to noise ratio (SNR) for those wavelengths, causing some link members 412a, 412b, 412c, or 412d to be unable to carry data and be removed from the LAG, thereby reducing the capacity of LAG 410. In another scenario, faults to the sensor pair may cause links 412a, 412b, 412c, 412d to be unusable and removed from the LAG, thereby reducing the capacity of the LAG. A capacity plot 420 shows the data-carrying capacity of the LAG on a per-unit length basis along the length of fiber optic cable 402.

For this example, link member 412a has the highest frequency, link member 412b has the second highest frequency, link member 412c has the second lowest frequency, and link member 412d has the lowest frequency. The capacities of link members 412a and 412b are shown as a line 422, indicating no loss in capacity. Link member 412c has a capacity drop 430 in the vicinity of bend 404, shown by a line 432. Link member 412d has a capacity drop 440 in the vicinity of bend 404, shown by a line 442. Capacity drops 430 and 440 result in a capacity drop for LAG 410, which produces a capacity drop for the hop from router 104b to router 104c along fiber optic cable 402, which results in a capacity drop for primary tunnel 110 for the duration of the time that bend 404 persists.

Figure 5:
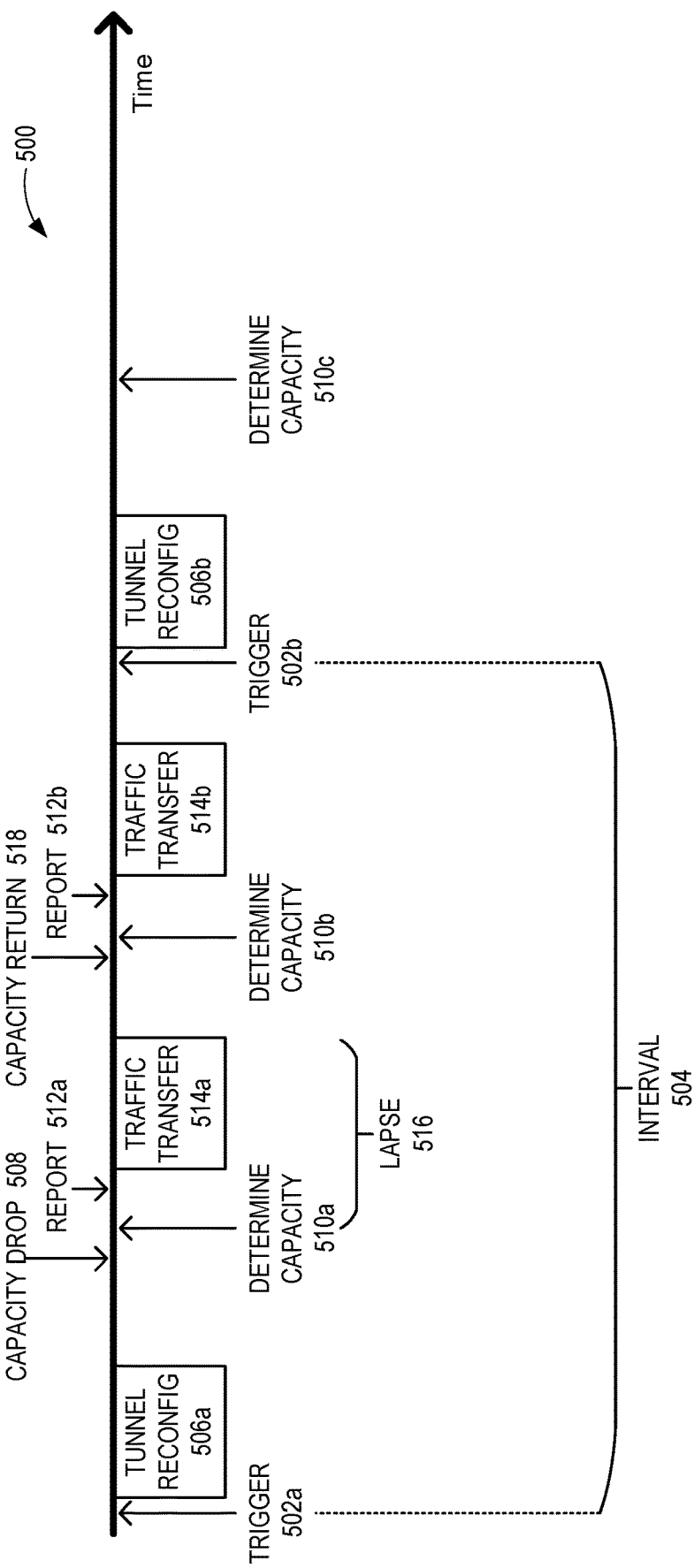
FIG. 5 illustrates an example timeline of events that may occur in the example architecture of FIG. 1.

FIG. 5 illustrates an example timeline 500 of events that may occur in architecture 100. A tunnel reconfiguration trigger event 502a is shown at the start of timeline 500, and another tunnel reconfiguration trigger event 502b is shown occurring at a later time. A time interval 504 between tunnel reconfiguration trigger events 502a and 502b may be measurable on the order of minutes, in some examples, and may be set at a fairly consistent pace.

Tunnel reconfiguration trigger event 502a starts a tunnel reconfiguration 506a, in which traffic engineering solver 130 determines primary tunnel 110 and alternate tunnel 112, and router programmer 144 programs the selected traffic engineering agents. After the completion of tunnel reconfiguration 506a, primary tunnel 110 and alternate tunnel 112 are in place and carrying data traffic. Similarly, tunnel reconfiguration trigger event 502b starts a tunnel reconfiguration 506b, in which traffic engineering solver 130 determines primary tunnel 210 and alternate tunnel 212, and router programmer 144 programs the selected traffic engineering agents. After the completion of tunnel reconfiguration 506b, primary tunnel 210 and alternate tunnel 212 are in place and carrying data traffic.

While primary tunnel 110 is in place, a capacity drop event 508 occurs, such as the introduction of bend 404 of FIG. 4. On some schedule, the traffic engineering agents each determine the capacity of the portion of the tunnel for which they are the start of the hop. For example, traffic engineering agent 106a determines the capacity between router 104a and router 104b, traffic engineering agent 106b determines the capacity between router 104b and router 104c, and traffic engineering agent 106c determines the capacity between router 104c and router 104d.

The determination of the tunnel hop capacity between individual routers may occur multiple times during time interval 504. For example, a capacity determination event 510a and a capacity determination event 510b both occur during time interval 504, and are both for determining the capacity between routers 104b and 104c. This is repeated for subsequent time intervals between tunnel reconfiguration trigger events, as indicated by a capacity determination event 510c following tunnel reconfiguration trigger event 502b (for routers of the next primary tunnel 210) Capacity determination events 510a and 510b may also occur any time a router experiences a LAG 410 membership change or link 412a-d fault.

In this example, the capacity drop occurs in the second hop, between routers 104b and 104c, and so is reported by router 104b to router 104a—because router 104a is the tunnel source router for primary tunnel 110. This takes time and is described in further detail in relation to FIGS. 6A and 6B. Router 104a receives the report of the tunnel hop capacity at report event 512a, and initiates a traffic transfer 514a of at least some traffic from primary tunnel 110 to alternate tunnel 112. Traffic transfer 514a is illustrated as taking at least some time, because the determination takes a short time, and data is in transit along primary tunnel 110, and some data may already be buffered for transmission along primary tunnel 110.

A time lapse 516 between determining the capacity of primary tunnel 110 between router 104b and router 104c at capacity determination event 510a and completing traffic transfer 514a is shown. Although timeline 500 is not drawn to scale, it does show two capacity determination events 510a and 510b and that time lapse 516 is completed prior to capacity determination event 510b. This indicates that time lapse 516 is less than half of time interval 504. In some examples, time interval 504 is measurable on the order of minutes, while time lapse 516 is measurable on the order of seconds.

Also shown in FIG. 5 is that the capacity of primary tunnel 110 is restored at a capacity return event 518. This may occur if bend 404 is noticed and corrected. The restoration of the capacity of primary tunnel is reported at report event 512b, and initiates a traffic transfer 514b of at least some traffic from alternate tunnel 112 back to primary tunnel 110. Note that, in this example, traffic was steered away from primary tunnel 110 and then back to primary tunnel 110, all within time interval 504. This demonstrates how the disclosure is able to perform more rapid traffic adjustments, in response to changing network conditions, than waiting for tunnel reconfigurations.

FIG. 6A illustrates communication among routers 104a-104c regarding capacity information along the hops of primary tunnel 110. Traffic engineering agent 106a of router 104a queries traffic engineering agents 106b and 106c of routers 104b and 104c, respectively. This is illustrated as router 104a sending a query 600a requesting capacity information 602a. Router 104b has measured capacity 604a of primary tunnel 110 between router 104b and 104c, and router 104c has measured capacity 604b of primary tunnel 110 between router 104c and 104d. In FIG. 6A, router 104c is a subsequent router 610 to router 104b, and router 104d is a subsequent router 612 to router 104c.

Router 104b sends capacity 604a to router 104a using either a peer-to-peer (P2P) message 606a from traffic engineering agent 106b to traffic engineering agent 106a, or using a routing protocol service message 608a from routing protocol service 108b to routing protocol service 108a. Similarly, router 104c sends capacity 604b to router 104a using either a P2P message 606b from traffic engineering agent 106c to traffic engineering agent 106a, or using a routing protocol service message 608b from routing protocol service 108c to routing protocol service 108a.

P2P messages are quicker but require more complexity in the traffic engineering agents. Routing protocol service messages may result in a simpler configuration, because routing protocol service components are typically provided with routers, but routing protocol service messages may require a longer time period to reach router 104a, adding a delay to the local repair timeline.

FIG. 6B illustrates communication among routers 104a, 104f, and 104g regarding capacity information along the hops of primary tunnel 210. Traffic engineering agent 106a of router 104a queries traffic engineering agents 106f and 106g of routers 104f and 104g, respectively. This is illustrated as router 104a sending a query 600b requesting capacity information 602b. Router 104f has measured capacity 604c of primary tunnel 210 between router 104f and 104g, and router 104g has measured capacity 604d of primary tunnel 210 between router 104g and 104d. In FIG. 6B, router 104g is a subsequent router 614 to router 104f, and router 104d is a subsequent router 616 to router 104g.

Router 104f sends capacity 604c to router 104a using either a P2P message 606c from traffic engineering agent 106f to traffic engineering agent 106a, or using a routing protocol service message 608c from routing protocol service 108f to routing protocol service 108a. Similarly, router 104g sends capacity 604c to router 104a using either a P2P message 606d from traffic engineering agent 106g to traffic engineering agent 106a, or using a routing protocol service message 608d from routing protocol service 108g to routing protocol service 108a.

Figure 7A:
FIGS. 7A, 7B, and 7C illustrate example data traffic splits among tunnels used within the example architecture of FIG. 1.

FIG. 7A illustrates a data traffic split among primary tunnel 110 and alternate tunnel 112 in a scenario 700a when the capacity of primary tunnel is above capacity threshold 310 of FIG. 3. All traffic 702 incoming into router 104a, labeled for a tunnel (i.e., either primary tunnel 110 or alternate tunnel 112) is split according to primary percentage 306 and alternate percentage 308. This determines how much data traffic passes through primary tunnel 110 and how much passes through alternate tunnel 112. For example, primary traffic 704a is the portion of all traffic 702 that matches primary percentage 306 and alternate traffic 706a is the portion of all traffic 702 that matches alternate percentage 308.

Figure 7B:
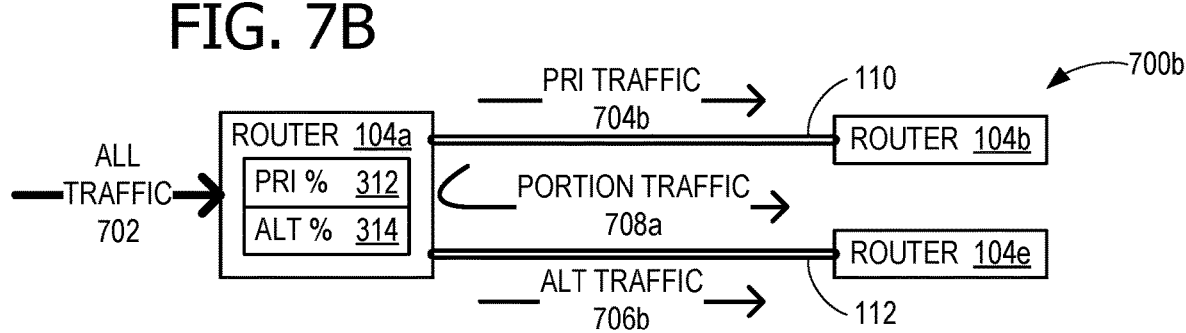

FIG. 7B illustrates a data traffic split among primary tunnel 110 and alternate tunnel 112 in a scenario 700b when the capacity of primary tunnel is below capacity threshold 310 but above capacity threshold 320 of FIG. 3. Primary traffic 704b is the portion of all traffic 702 that matches primary percentage 312 and alternate traffic 706b is the portion of all traffic 702 that matches alternate percentage 314. A portion 708a of traffic for primary tunnel 110 is transferred to alternate tunnel 112. For example, the amount of portion 708a may be determined by subtracting primary percentage 312 from primary percentage 306.

Figure 7C:
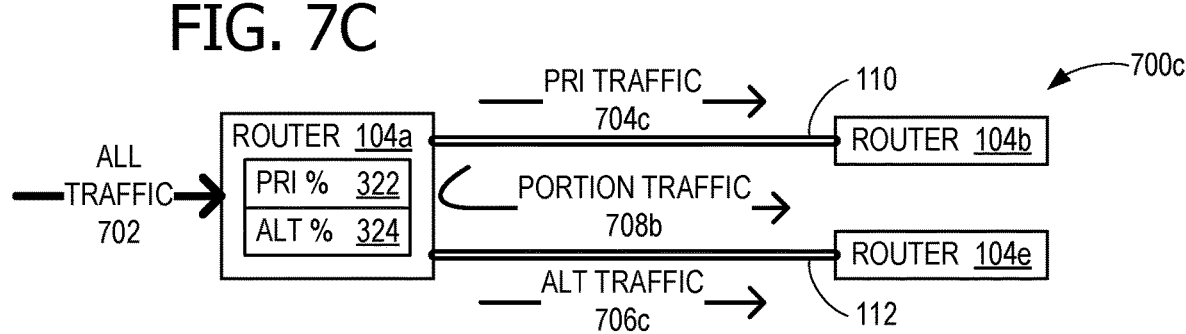

FIG. 7C illustrates a data traffic split among primary tunnel 110 and alternate tunnel 112 in a scenario 700c when the capacity of primary tunnel is below capacity threshold 320. Primary traffic 704c is the portion of all traffic 702 that matches primary percentage 322 and alternate traffic 706c is the portion of all traffic 702 that matches alternate percentage 324. A portion 708b of traffic for primary tunnel 110 is transferred to alternate tunnel 112. For example, the amount of portion 708b may be determined by subtracting primary percentage 322 from primary percentage 306. In general, the amount of portion 708b is greater than the amount of portion 708a.

Figure 8A:
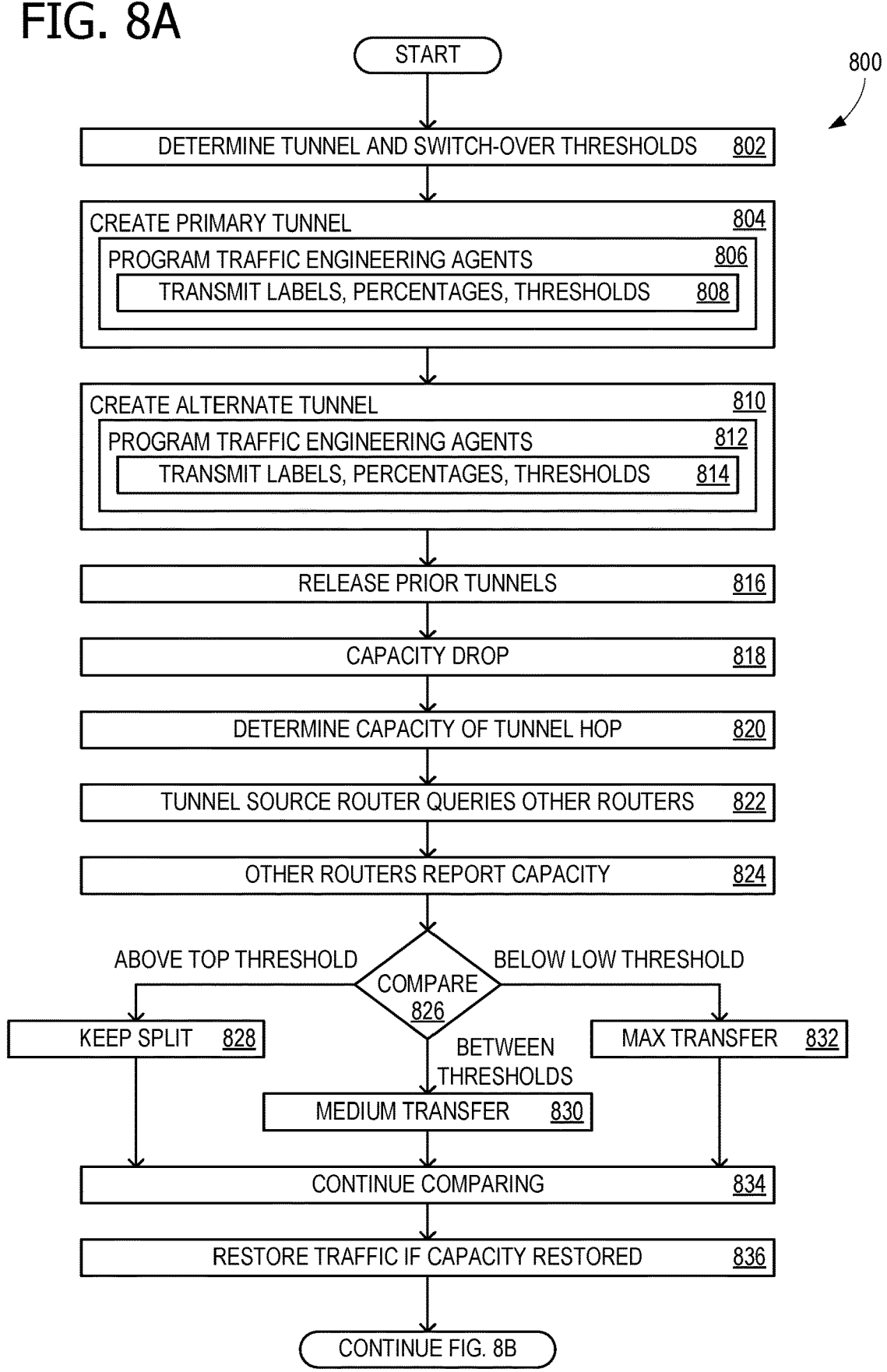
FIGS. 8A, 8B, and 9 show flowcharts illustrating exemplary operations that may be performed when using example architectures, such as the architecture of FIG. 1.
Figure 8B:
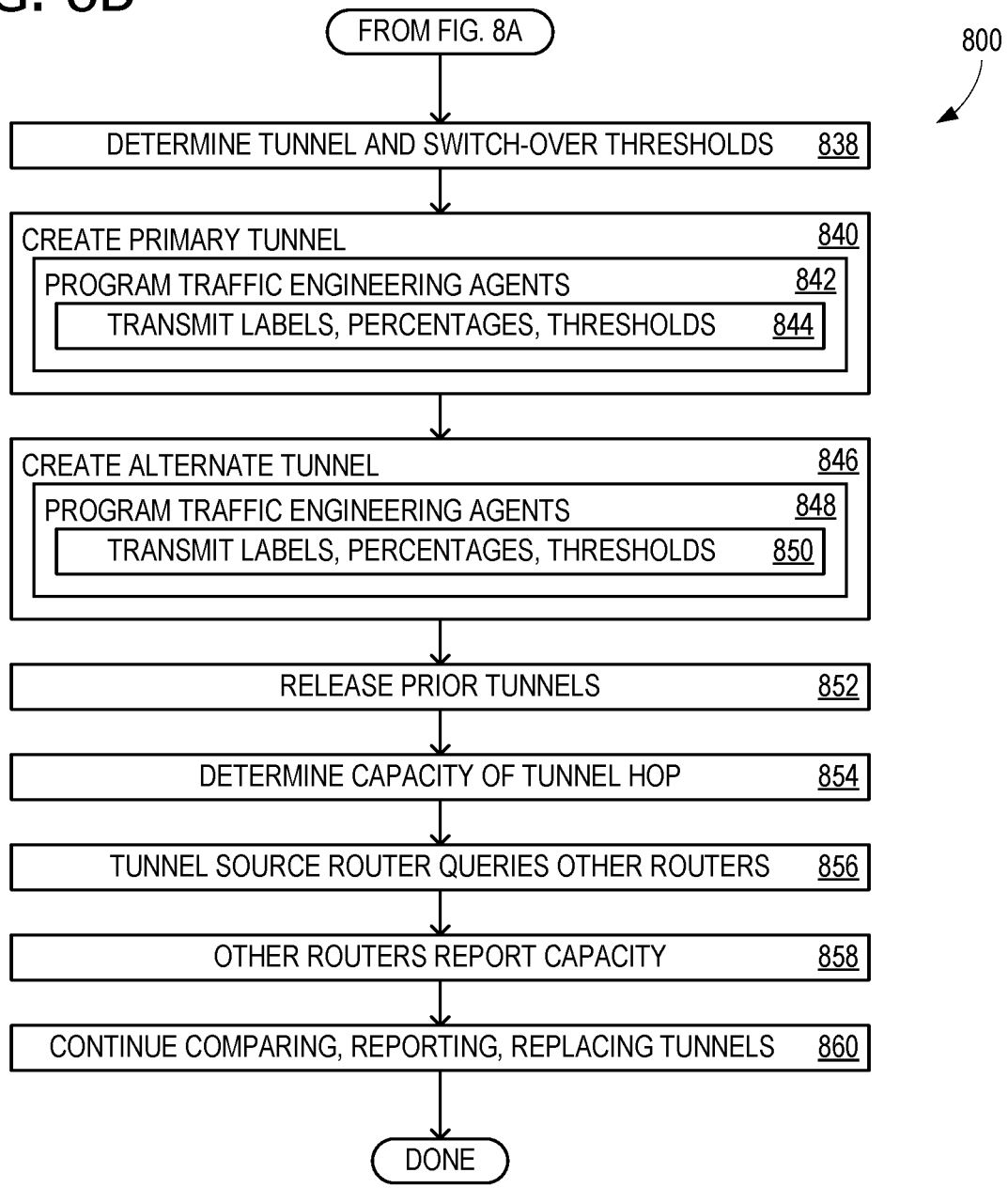

FIGS. 8A and 8B together show a flowchart 800 illustrating exemplary operations that may be performed by architecture 100. In some examples, operations described for flowchart 800 are performed by computing device 1000 of FIG. 10. In FIG. 8A, flowchart 800 commences with traffic engineering controller 120 determining route 132 of primary tunnel 110, route 136 of alternate tunnel 112, and capacity threshold 310, in operation 802. In some examples, traffic engineering controller 120 also determines capacity threshold 320.

Operation 804 creates primary tunnel 110 in packet switched network 102. Primary tunnel 110 comprises (tunnel source) router 104a, (tunnel destination) router 104d, and (mid-tunnel) router 104b disposed between router 104a and router 104d. Primary tunnel 110 further comprises (mid-tunnel) router 104c disposed between router 104b and router 104d. Operation 804 is performed using operations 806 and 808. Operation 806 programs traffic engineering agents 106a-106c of routers 104a-104c, respectively. In operation 808, router programmer 144 of traffic engineering controller 120 transmits portions 304a, portion 334, and portion 344 of the route of primary tunnel 110 to routers 104a, 104b, and 104c, respectively. Traffic engineering controller 120 also transmits capacity thresholds 310 and 320 to router 104a.

Operation 810 creates alternate tunnel 112 in packet switched network 102. Alternate tunnel 112 comprises (tunnel source) router 104a, (tunnel destination) router 104d, and (mid-tunnel) routers 104e, 104i-104l, and 104h, all disposed between router 104a and router 104d. Operation 810 is performed using operations 812 and 816. Operation 812 programs traffic engineering agents 106a, 106e, 106l-106l, and 106h of routers 104a, 104e, 104i-104l, and 104h, respectively. In operation 814, traffic engineering controller 120 (using router programmer 144) transmits portions of the route of alternate tunnel 112 to the routers of alternate tunnel 112.

Operation 816 releases any prior tunnels, so that traffic is now over primary tunnel 110 and alternate tunnel 112. Capacity drop event 508 occurs as operation 818, and in operation 820, router 104b determines the capacity of primary tunnel 110 between router 104b and router 104c, which is subsequent router 610 (for router 104b). Also in operation 820, router 104c determines the capacity of primary tunnel 110 between router 104c and router 104d, which is subsequent router 612 (for router 104c). If primary tunnel 110 bypasses router 104c and goes directly from router 104b to router 104d, router 104d is subsequent router 610 (for router 104b).

In operation 822, traffic engineering agent 106a of tunnel source router 104a queries for the capacity of primary tunnel 110 between router 104b and router 104c, and also for the capacity of primary tunnel 110 between router 104c and router 104d. These values are placed into capacity information 602a. Router 104b and router 104c report the requested capacity information to router 104a in operation 824. In some examples, router 104b and router 104c perform the reporting in response to the querying by traffic engineering agent 106a of tunnel source router 104a. In some examples, there is no querying, and routers 104b and 104c report the capacity information on their own.

In decision operation 826, router agent 106a compares the current reported (and measured) capacity of primary tunnel 110 with capacity thresholds 310 (top threshold) and 320 (low threshold). If the capacity of primary tunnel 110 is above capacity threshold 310, flowchart 800 moves to operation 828 and keeps the current traffic split percentages. If the capacity of primary tunnel 110 is below capacity threshold 310 but above capacity threshold 320 (i.e., between capacity thresholds 310 and 320), flowchart 800 moves to operation 830 and uses primary percentage 312 and alternate percentage 314. If the capacity of primary tunnel 110 is below capacity threshold 320, flowchart 800 moves to operation 832 and uses primary percentage 322 and alternate percentage 324. Operation 830 transfers portion 708a of traffic for primary tunnel 110 (all traffic 702) to alternate tunnel 112. Operation 832 transfers portion 708b of traffic for primary tunnel 110 to alternate tunnel 112. In some examples, in operation 832, all traffic that had been going through primary tunnel 110 is transferred, although some examples transfer less than all.

Operation 834 represents the continuing measurement, reporting and comparison of the capacity of primary tunnel 110 for the various hops of primary tunnel 110 with capacity thresholds 310 and 320. If the capacity of primary tunnel 110 is restored (i.e., rises above capacity threshold 310) after traffic had been steered to alternate tunnel 112, operation 836 transfers the steered portion (i.e., portion 708a or 708b) of traffic for primary tunnel 110 from alternate tunnel 112 back to primary tunnel 110.

In FIG. 8B, flowchart 800 continues with traffic engineering controller 120 determining route 152 of primary tunnel 210, route 156 of alternate tunnel 212, and capacity threshold 360, in operation 838. In some examples, traffic engineering controller 120 also determines capacity threshold 370.

Operation 840 creates primary tunnel 210 in packet switched network 102. Primary tunnel 210 comprises (tunnel source) router 104a, (tunnel destination) router 104d, and (mid-tunnel) router 104f disposed between router 104a and router 104d. Primary tunnel 210 further comprises (mid-tunnel) router 104g disposed between router 104f and router 104d. Operation 840 is performed using operations 842 and 844. Operation 842 programs traffic engineering agents 106a, 106f, and 106g of routers 104a, 104f, and 104g. In operation 844, router programmer 144 of traffic engineering controller 120 transmits portions 354a, portion 384, and portion 394 of the route of primary tunnel 210 to routers 104a, 104f, and 104g, respectively. Traffic engineering controller 120 also transmits capacity thresholds 360 and 370 to router 104a.

Operation 846 creates alternate tunnel 212 in packet switched network 102. Alternate tunnel 212 comprises (tunnel source) router 104a, (tunnel destination) router 104d, and (mid-tunnel) routers 104e, 104i, 104n, 104m, 104l, and 104h, all disposed between router 104a and router 104d. Operation 848 is performed using operations 848 and 850. Operation 848 programs traffic engineering agents 106a, 106e, 106i, 106n, 106m, 106l, and 106h of routers 104a, 104e, 104i, 104n, 104o, 104l, and 104h. In operation 850, traffic engineering controller 120 (using router programmer 144) transmits portions of the route of alternate tunnel 212 to the routers of alternate tunnel 212.

Operation 852 releases the prior tunnels (i.e., primary tunnel 110 and alternate tunnel 112), so that traffic is now over primary tunnel 210 and alternate tunnel 212. In operation 854, router 104f determines the capacity of primary tunnel 210 between router 104f and router 104g, which is subsequent router 614 (for router 104f). Also in operation 854, router 104g determines the capacity of primary tunnel 210 between router 104g and router 104d, which is subsequent router 616 (for router 104g).

In operation 856, traffic engineering agent 106a of tunnel source router 104a queries for the capacity of primary tunnel 210 between router 104f and router 104g, and also for the capacity of primary tunnel 210 between router 104g and router 104d. These values are placed into capacity information 602b. Router 104f and router 104g report the requested capacity information to router 104a in operation 858. Operation 860 represents the continuing measurement, reporting and comparison of the capacity of primary tunnel 210 for the various hops of primary tunnel 210 with capacity thresholds 360 and 370.

Figure 9:
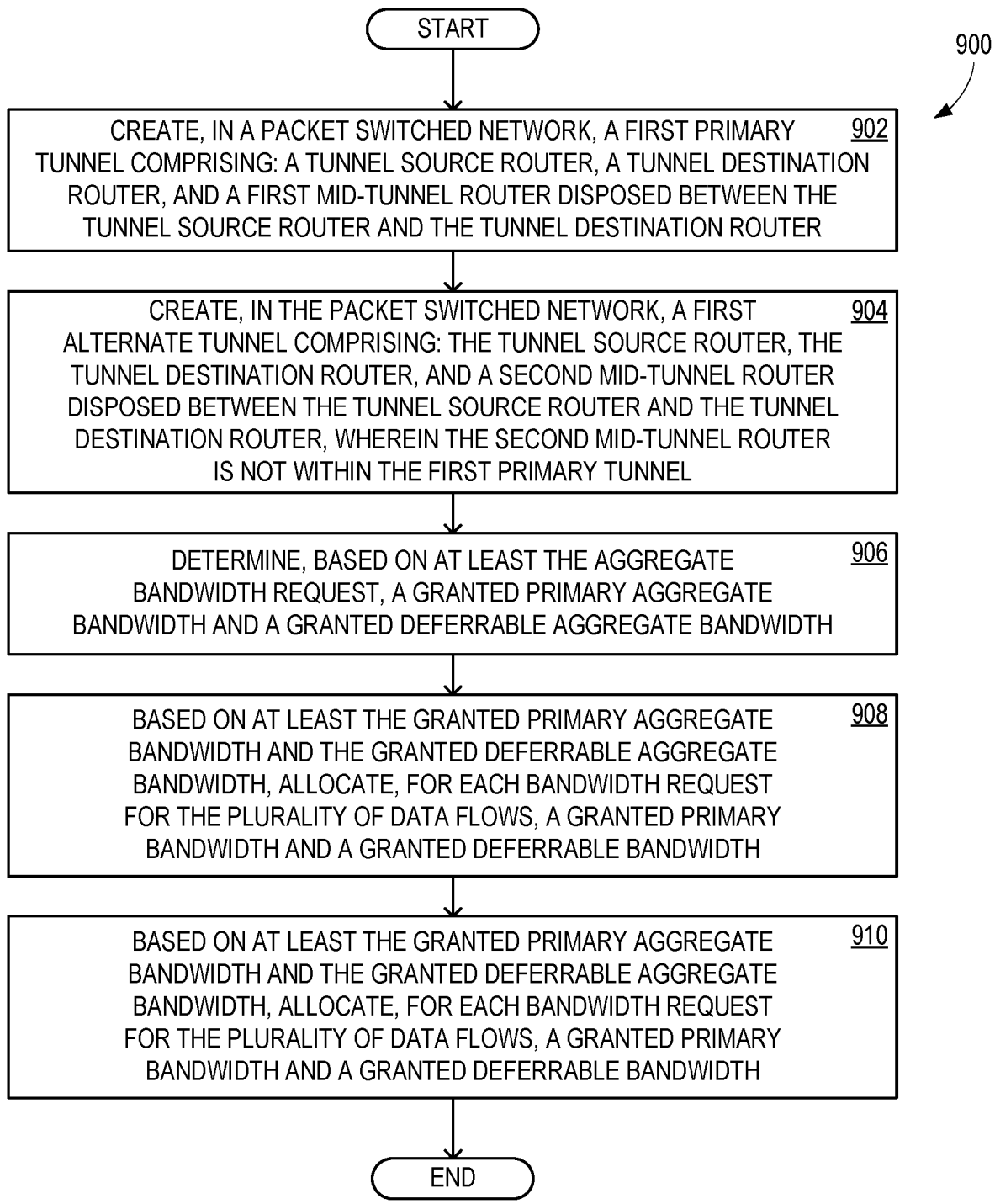

FIG. 9 shows a flowchart 900 illustrating exemplary operations that may be performed by architecture 100. In some examples, operations described for flowchart 900 are performed by computing device 1000 of FIG. 10. Flowchart 900 commences with operation 902, which includes creating, in a packet switched network, a first primary tunnel comprising: a tunnel source router, a tunnel destination router, and a first mid-tunnel router disposed between the tunnel source router and the tunnel destination router.

Operation 904 includes creating, in the packet switched network, a first alternate tunnel comprising: the tunnel source router, the tunnel destination router, and a second mid-tunnel router disposed between the tunnel source router and the tunnel destination router, wherein the second mid-tunnel router is not within the first primary tunnel. Operation 906 includes determining, by the first mid-tunnel router, a capacity of the first primary tunnel between the first mid-tunnel router and a first subsequent router of the first primary tunnel, wherein the first subsequent router of the first primary tunnel is not within the first alternate tunnel.

Operation 908 includes comparing the capacity of the first primary tunnel between the first mid-tunnel router and the first subsequent router of the first primary tunnel with a first capacity threshold. Operation 910 includes, based on at least the capacity of the first primary tunnel between the first mid-tunnel router and the first subsequent router of the first primary tunnel dropping below the first capacity threshold, transferring at least a portion of traffic for the first primary tunnel to the first alternate tunnel.

Additional Examples

An example system comprises: a processor; and a computer-readable medium storing instructions that are operative upon execution by the processor to: create, in a packet switched network, a first primary tunnel comprising: a tunnel source router, a tunnel destination router, and a first mid-tunnel router disposed between the tunnel source router and the tunnel destination router: create, in the packet switched network, a first alternate tunnel comprising: the tunnel source router, the tunnel destination router, and a second mid-tunnel router disposed between the tunnel source router and the tunnel destination router, wherein the second mid-tunnel router is not within the first primary tunnel; determine, by the first mid-tunnel router, a capacity of the first primary tunnel between the first mid-tunnel router and a first subsequent router of the first primary tunnel, wherein the first subsequent router of the first primary tunnel is not within the first alternate tunnel: compare the capacity of the first primary tunnel between the first mid-tunnel router and the first subsequent router of the first primary tunnel with a first capacity threshold; and based on at least the capacity of the first primary tunnel between the first mid-tunnel router and the first subsequent router of the first primary tunnel dropping below the first capacity threshold, transfer at least a portion of traffic for the first primary tunnel to the first alternate tunnel.

An example computer-implemented method comprises: creating, in a packet switched network, a first primary tunnel comprising: a tunnel source router, a tunnel destination router, and a first mid-tunnel router disposed between the tunnel source router and the tunnel destination router: creating, in the packet switched network, a first alternate tunnel comprising: the tunnel source router, the tunnel destination router, and a second mid-tunnel router disposed between the tunnel source router and the tunnel destination router, wherein the second mid-tunnel router is not within the first primary tunnel: determining, by the first mid-tunnel router, a capacity of the first primary tunnel between the first mid-tunnel router and a first subsequent router of the first primary tunnel, wherein the first subsequent router of the first primary tunnel is not within the first alternate tunnel: comparing the capacity of the first primary tunnel between the first mid-tunnel router and the first subsequent router of the first primary tunnel with a first capacity threshold; and based on at least the capacity of the first primary tunnel between the first mid-tunnel router and the first subsequent router of the first primary tunnel dropping below the first capacity threshold, transferring at least a portion of traffic for the first primary tunnel to the first alternate tunnel.

One or more example computer storage devices have computer-executable instructions stored thereon, which, on execution by a computer, cause the computer to perform operations comprising: creating, in a packet switched network, a first primary tunnel comprising: a tunnel source router, a tunnel destination router, and a first mid-tunnel router disposed between the tunnel source router and the tunnel destination router; creating, in the packet switched network, a first alternate tunnel comprising: the tunnel source router, the tunnel destination router, and a second mid-tunnel router disposed between the tunnel source router and the tunnel destination router, wherein the second mid-tunnel router is not within the first primary tunnel: determining, by the first mid-tunnel router, a capacity of the first primary tunnel between the first mid-tunnel router and a first subsequent router of the first primary tunnel, wherein the first subsequent router of the first primary tunnel is not within the first alternate tunnel: comparing the capacity of the first primary tunnel between the first mid-tunnel router and the first subsequent router of the first primary tunnel with a first capacity threshold; and based on at least the capacity of the first primary tunnel between the first mid-tunnel router and the first subsequent router of the first primary tunnel dropping below the first capacity threshold, transferring at least a portion of traffic for the first primary tunnel to the first alternate tunnel.

Alternatively, or in addition to the other examples described herein, examples include any combination of the following:
- replacing, in the packet switched network, the first primary tunnel with a second primary tunnel, the second primary tunnel comprising: the tunnel source router, the tunnel destination router, and a third mid-tunnel router disposed between the tunnel source router and the tunnel destination router;
- determining, by the third mid-tunnel router, a capacity of the second primary tunnel between the third mid-tunnel router and a subsequent router of the second primary tunnel;
- comparing the capacity of the second primary tunnel between the third mid-tunnel router and the subsequent router of the second primary tunnel with a second capacity threshold;
- determining, by a traffic engineering controller, a route of the first primary tunnel, a route of the first alternate tunnel, and the first capacity threshold;
- transmitting, by the traffic engineering controller, to the tunnel source router, at least a first portion of the route of the first primary tunnel, at least a portion of the route of the first alternate tunnel, and the first capacity threshold;
- transmitting, by the traffic engineering controller, to the first mid-tunnel router, at least a second portion of the route of the first primary tunnel;
- on a tunnel reconfiguration trigger event, determining, by the traffic engineering controller, a route of the second primary tunnel, a route of a second alternate tunnel, and the second capacity threshold;
- transmitting, by the traffic engineering controller, to the tunnel source router, at least a first portion of the route of the second primary tunnel, at least a portion of the route of the second alternate tunnel, and the second capacity threshold;

transmitting, by the traffic engineering controller, to the third mid-tunnel router, at least a second portion of the route of the second primary tunnel and the second capacity threshold;
reporting, by the first mid-tunnel router, to the tunnel source router, the capacity of the first primary tunnel between the first mid-tunnel router and the first subsequent router of the first primary tunnel;
the tunnel source router transfers the portion of traffic for the first primary tunnel to a first alternate tunnel;
querying, by a traffic engineering agent of the tunnel source router, a traffic engineering agent of the first mid-tunnel router for the capacity of the first primary tunnel between the first mid-tunnel router and the first subsequent router of the first primary tunnel;
the reporting by the first mid-tunnel router is based on at least the querying by the traffic engineering agent of the tunnel source router;
the reporting by the first mid-tunnel router comprises using a routing protocol to send the capacity of the first primary tunnel between the first mid-tunnel router and the first subsequent router of the first primary tunnel;
continuing to compare the capacity of the first primary tunnel between the first mid-tunnel router and the first subsequent router of the first primary tunnel with the first capacity threshold;
based on at least the capacity of the first primary tunnel between the first mid-tunnel router and the first subsequent router of the first primary tunnel rising above the first capacity threshold, transferring the portion of traffic for the first primary tunnel from the first alternate tunnel back to the first primary tunnel;
the first primary tunnel further comprises a fourth mid-tunnel router disposed between the first mid-tunnel router and the tunnel destination router;
the first subsequent router of the first primary tunnel comprises the fourth mid-tunnel router;
determining, by the fourth mid-tunnel router, a capacity of the first primary tunnel between the fourth mid-tunnel router and a second subsequent router of the first primary tunnel;
first mid-tunnel router is not within the first alternate tunnel;
the third mid-tunnel router had not been in the first primary tunnel;
at least one router of the first primary tunnel is not in the second primary tunnel;
the first subsequent router of the first primary tunnel comprises the tunnel destination router;
the second subsequent router of the first primary tunnel comprises the tunnel destination router;
the second capacity threshold equals the first capacity threshold;
creating the first primary tunnel comprises programming, by the traffic engineering controller, the traffic engineering agent of the tunnel source router and the traffic engineering agent of the first mid-tunnel router;
creating the first alternate tunnel comprises programming, by the traffic engineering controller, the traffic engineering agent of the tunnel source router and a traffic engineering agent of the second mid-tunnel router;
creating the second primary tunnel comprises programming, by the traffic engineering controller, the traffic engineering agent of the tunnel source router and the traffic engineering agent of the third mid-tunnel router;

transmitting, by the traffic engineering controller, to the first mid-tunnel router, at least a second portion of the route of the first alternate tunnel;
transmitting, by the traffic engineering controller, to the fourth mid-tunnel router, at least a third portion of the route of the first alternate tunnel;
transmitting, by the traffic engineering controller, to the third mid-tunnel router, at least a second portion of the route of the second alternate tunnel;
reporting, by the fourth mid-tunnel router, to the tunnel source router, the capacity of the first primary tunnel between the fourth mid-tunnel router and the second subsequent router of the first primary tunnel;
reporting, by the third mid-tunnel router, to the tunnel source router, the capacity of the second primary tunnel between the third mid-tunnel router and the subsequent router of the second primary tunnel;
the portion of traffic for the first primary tunnel that is transferred to the first alternate tunnel comprises all of the traffic for the first primary tunnel;
the portion of traffic for the first primary tunnel that is transferred to the first alternate tunnel comprises less than all of the traffic for the first primary tunnel;
replacing the first primary tunnel with the second primary tunnel comprises: creating the second primary tunnel; and releasing the first primary tunnel;
a time lapse between determining the capacity of the first primary tunnel between the first mid-tunnel router and the first subsequent router of the first primary tunnel and completing the transfer of the portion of traffic for the first primary tunnel to the first alternate tunnel is less than half a time interval between tunnel reconfiguration trigger events;
prior to transferring the portion of the traffic for the first primary tunnel to the first alternate tunnel, the first primary tunnel has a first percentage of traffic passing through the tunnel source router, and the first alternate tunnel has a second percentage of traffic passing through the tunnel source router;
after transferring the portion of the traffic for the first primary tunnel to the first alternate tunnel, the first primary tunnel has less than the first percentage of traffic passing through the tunnel source router, and the first alternate tunnel has greater than the second percentage of traffic passing through the tunnel source router;
comparing the capacity of the first primary tunnel between the first mid-tunnel router and the first subsequent router of the first primary tunnel with a third capacity threshold;
based on at least the capacity of the first primary tunnel between the first mid-tunnel router and the first subsequent router of the first primary tunnel dropping below the third capacity threshold, transferring a second portion of traffic for the first primary tunnel to the first alternate tunnel;
determining, by the traffic engineering controller, the third capacity threshold;
transmitting, by the traffic engineering controller, to the tunnel source router, the third capacity threshold; and
the tunnel source router queries the first mid-tunnel router, the second mid-tunnel router, the third mid-tunnel router, and the fourth mid-tunnel router for capacity information.

While the aspects of the disclosure have been described in terms of various examples with their associated operations, a person skilled in the art would appreciate that a combination of operations from any number of different examples is also within scope of the aspects of the disclosure.

Example Operating Environment

Figure 10:
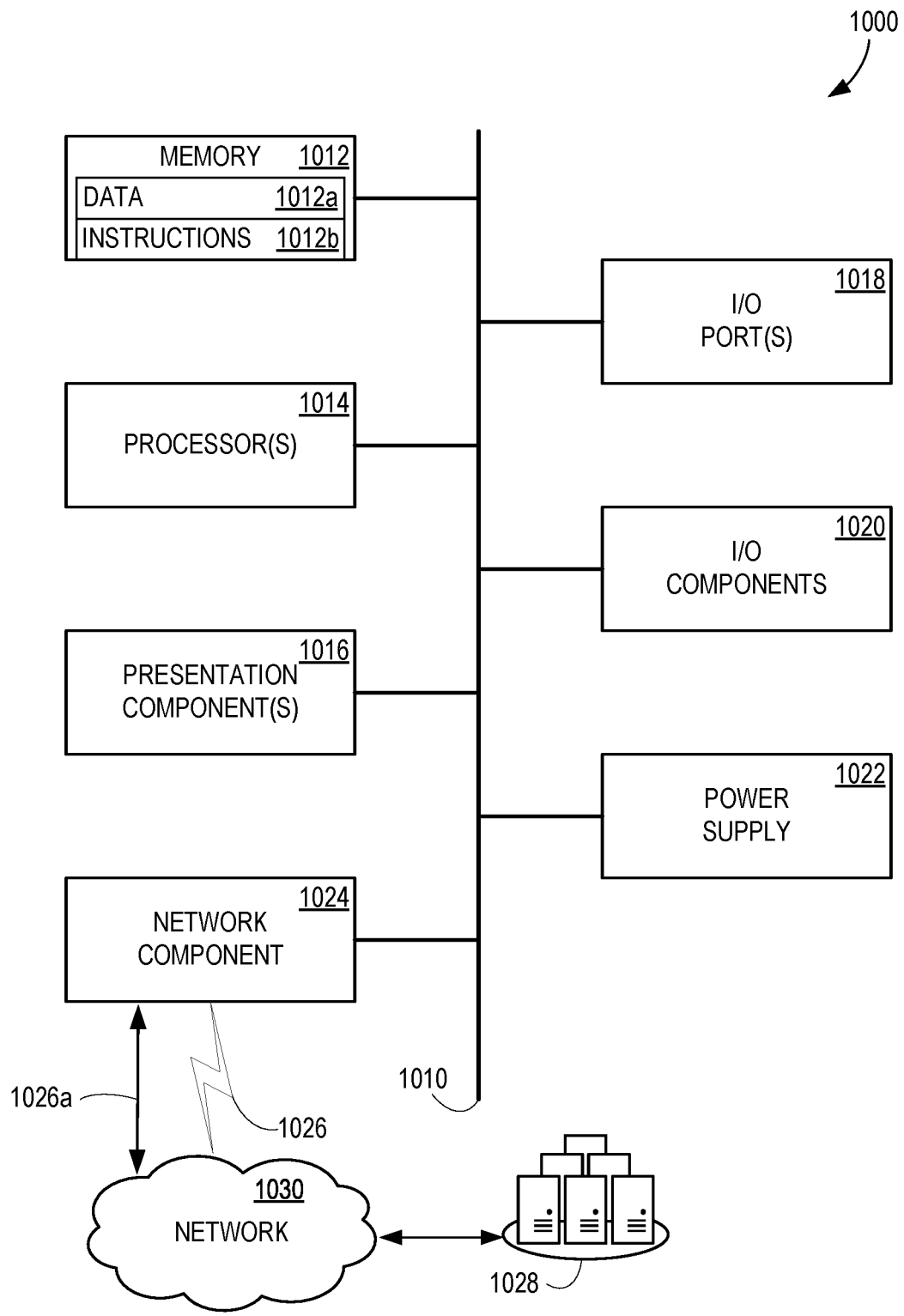
FIG. 10 shows a block diagram of an example computing device suitable for implementing some of the various examples disclosed herein.

FIG. 10 is a block diagram of an example computing device 1000 (e.g., a computer storage device) for implementing aspects disclosed herein, and is designated generally as computing device 1000. In some examples, one or more computing devices 1000 are provided for an on-premises computing solution. In some examples, one or more computing devices 1000 are provided as a cloud computing solution. In some examples, a combination of on-premises and cloud computing solutions are used. Computing device 1000 is but one example of a suitable computing environment and is not intended to suggest any limitation as to the scope of use or functionality of the examples disclosed herein, whether used singly or as part of a larger set.

Neither should computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer storage memory 1012, one or more processors 1014, one or more presentation components 1016, input/output (I/O) ports 1018, I/O components 1020, a power supply 1022, and a network component 1024. While computing device 1000 is depicted as a seemingly single device, multiple computing devices 1000 may work together and share the depicted device resources. For example, memory 1012 may be distributed across multiple devices, and processor(s) 1014 may be housed with different devices.

Bus 1010 represents what may be one or more busses (such as an address bus, data bus, or a combination thereof). Although the various blocks of FIG. 10 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device." Memory 1012 may take the form of the computer storage media referenced below and operatively provide storage of computer-readable instructions, data structures, program modules and other data for the computing device 1000. In some examples, memory 1012 stores one or more of an operating system, a universal application platform, or other program modules and program data. Memory 1012 is thus able to store and access data 1012a and instructions 1012b that are executable by processor 1014 and configured to carry out the various operations disclosed herein.

In some examples, memory 1012 includes computer storage media. Memory 1012 may include any quantity of memory associated with or accessible by the computing device 1000. Memory 1012 may be internal to the computing device 1000 (as shown in FIG. 10), external to the computing device 1000 (not shown), or both (not shown). Additionally, or alternatively, the memory 1012 may be distributed across multiple computing devices 1000, for example, in a virtualized environment in which instruction processing is carried out on multiple computing devices 1000. For the purposes of this disclosure, "computer storage media," "computer storage memory," "memory," and "memory devices" are synonymous terms for the memory 1012, and none of these terms include carrier waves or propagating signaling.

Processor(s) 1014 may include any quantity of processing units that read data from various entities, such as memory 1012 or I/O components 1020. Specifically, processor(s) 1014 are programmed to execute computer-executable instructions for implementing aspects of the disclosure. The instructions may be performed by the processor, by multiple processors within the computing device 1000, or by a processor external to the client computing device 1000. In some examples, the processor(s) 1014 are programmed to execute instructions such as those illustrated in the flow charts discussed below and depicted in the accompanying drawings. Moreover, in some examples, the processor(s) 1014 represent an implementation of analog techniques to perform the operations described herein. For example, the operations may be performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

Computing device 1000 may operate in a networked environment via the network component 1024 using logical connections to one or more remote computers. In some examples, the network component 1024 includes a network interface card and/or computer-executable instructions (e.g., a driver) for operating the network interface card. Communication between the computing device 1000 and other devices may occur using any protocol or mechanism over any wired or wireless connection. In some examples, network component 1024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1024 communicates over wireless communication link 1026 and/or a wired communication link 1026a to a remote resource 1028 (e.g., a cloud resource) across network 1030.

Various different examples of communication links 1026 and 1026a include a wireless connection, a wired connection, and/or a dedicated link, and in some examples, at least a portion is routed through the internet.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    a processor; and
    a computer-readable medium storing instructions that are operative upon execution by the processor to:
        create, in a packet switched network, a first primary tunnel comprising:
            a tunnel source router,
            a tunnel destination router, and
            a first mid-tunnel router disposed between the tunnel source router and the tunnel destination router;
        create, in the packet switched network, a first alternate tunnel comprising:
            the tunnel source router,
            the tunnel destination router, and
            a second mid-tunnel router disposed between the tunnel source router and the tunnel destination router, wherein the second mid-tunnel router is not within the first primary tunnel;
        determine, by the first mid-tunnel router, a capacity of the first primary tunnel between the first mid-tunnel router and a first subsequent router of the first primary tunnel, wherein the first subsequent router of the first primary tunnel is not within the first alternate tunnel;
        report, by the first mid-tunnel router, the capacity of the first primary tunnel between the first mid-tunnel router and the first subsequent router of the first primary tunnel in response to a query from the tunnel source router of the first primary tunnel;

compare the capacity of the first primary tunnel between the first mid-tunnel router and the first subsequent router of the first primary tunnel with a first capacity threshold; and based on at least the capacity of the first primary tunnel between the first mid-tunnel router and the first subsequent router of the first primary tunnel dropping below the first capacity threshold, transfer at least a portion of traffic for the first primary tunnel to the first alternate tunnel.

2. The system of claim 1, wherein the instructions are further operative to:

replace, in the packet switched network, the first primary tunnel with a second primary tunnel, the second primary tunnel comprising:
the tunnel source router,
the tunnel destination router, and
a third mid-tunnel router disposed between the tunnel source router and the tunnel destination router;

determine, by the third mid-tunnel router, a capacity of the second primary tunnel between the third mid-tunnel router and a subsequent router of the second primary tunnel; and compare the capacity of the second primary tunnel between the third mid-tunnel router and the subsequent router of the second primary tunnel with a second capacity threshold.

3. The system of claim 2, wherein the instructions are further operative to:

determine, by a traffic engineering controller, a route of the first primary tunnel, a route of the first alternate tunnel, and the first capacity threshold;

transmit, by the traffic engineering controller, to the tunnel source router, at least a first portion of the route of the first primary tunnel, at least a portion of the route of the first alternate tunnel, and the first capacity threshold;

transmit, by the traffic engineering controller, to the first mid-tunnel router, at least a second portion of the route of the first primary tunnel;

based on a tunnel reconfiguration trigger event, determine, by the traffic engineering controller, a route of the second primary tunnel, a route of a second alternate tunnel, and the second capacity threshold;

transmit, by the traffic engineering controller, to the tunnel source router, at least a first portion of the route of the second primary tunnel, at least a portion of the route of the second alternate tunnel, and the second capacity threshold; and transmit, by the traffic engineering controller, to the third mid-tunnel router, at least a second portion of the route of the second primary tunnel and the second capacity threshold.

4. The system of claim 1,
wherein the tunnel source router transfers the portion of the traffic for the first primary tunnel to the first alternate tunnel.

5. The system of claim 1, wherein
the query is from a traffic engineering agent of the tunnel source router of the first primary tunnel and wherein reporting by the first mid-tunnel router is based on at least the query from the traffic engineering agent of the tunnel source router.

6. The system of claim 4, wherein reporting by the first mid-tunnel router comprises using a routing protocol to send the capacity of the first primary tunnel between the first mid-tunnel router and the first subsequent router of the first primary tunnel.

7. The system of claim 1, wherein the instructions are further operative to:

continue to compare the capacity of the first primary tunnel between the first mid-tunnel router and the first subsequent router of the first primary tunnel with the first capacity threshold; and based on at least the capacity of the first primary tunnel between the first mid-tunnel router and the first subsequent router of the first primary tunnel rising above the first capacity threshold, transfer the portion of the traffic for the first primary tunnel from the first alternate tunnel back to the first primary tunnel.

8. The system of claim 1,
wherein the first primary tunnel further comprises:
a third mid-tunnel router disposed between the first mid-tunnel router and the tunnel destination router;
wherein the first subsequent router of the first primary tunnel comprises the third mid-tunnel router; and
wherein the instructions are further operative to:
determine, by the third mid-tunnel router, a capacity of the first primary tunnel between the third mid-tunnel router and a second subsequent router of the first primary tunnel.

9. A computer-implemented method comprising:
creating, in a packet switched network, a first primary tunnel comprising:
a tunnel source router,
a tunnel destination router, and
a first mid-tunnel router disposed between the tunnel source router and the tunnel destination router;

creating, in the packet switched network, a first alternate tunnel comprising:
the tunnel source router,
the tunnel destination router, and
a second mid-tunnel router disposed between the tunnel source router and the tunnel destination router, wherein the second mid-tunnel router is not within the first primary tunnel;

determining, by the first mid-tunnel router, a capacity of the first primary tunnel between the first mid-tunnel router and a first subsequent router of the first primary tunnel, wherein the first subsequent router of the first primary tunnel is not within the first alternate tunnel;

reporting, by the first mid-tunnel router, the capacity of the first primary tunnel between the first mid-tunnel router and the first subsequent router of the first primary tunnel in response to a query from the tunnel source router of the first primary tunnel;

comparing the capacity of the first primary tunnel between the first mid-tunnel router and the first subsequent router of the first primary tunnel with a first capacity threshold; and based on at least the capacity of the first primary tunnel between the first mid-tunnel router and the first subsequent router of the first primary tunnel dropping below the first capacity threshold, transferring at least a portion of traffic for the first primary tunnel to the first alternate tunnel.

10. The computer-implemented method of claim 9, further comprising:

replacing, in the packet switched network, the first primary tunnel with a second primary tunnel, the second primary tunnel comprising:
the tunnel source router,
the tunnel destination router, and
a third mid-tunnel router disposed between the tunnel source router and the tunnel destination router;

determining, by the third mid-tunnel router, a capacity of the second primary tunnel between the third mid-tunnel router and a subsequent router of the second primary tunnel; and comparing the capacity of the second primary tunnel between the third mid-tunnel router and the subsequent router of the second primary tunnel with a second capacity threshold.

11. The computer-implemented method of claim 10, further comprising:

determining, by a traffic engineering controller, a route of the first primary tunnel, a route of the first alternate tunnel, and the first capacity threshold;

transmitting, by the traffic engineering controller, to the tunnel source router, at least a first portion of the route of the first primary tunnel, at least a portion of the route of the first alternate tunnel, and the first capacity threshold;

transmitting, by the traffic engineering controller, to the first mid-tunnel router, at least a second portion of the route of the first primary tunnel;

based on a tunnel reconfiguration trigger event, determining, by the traffic engineering controller, a route of the second primary tunnel, a route of a second alternate tunnel, and the second capacity threshold;

transmitting, by the traffic engineering controller, to the tunnel source router, at least a first portion of the route of the second primary tunnel, at least a portion of the route of the second alternate tunnel, and the second capacity threshold; and transmitting, by the traffic engineering controller, to the third mid-tunnel router, at least a second portion of the route of the second primary tunnel and the second capacity threshold.

12. The computer-implemented method of claim 9, wherein the tunnel source router transfers the portion of traffic for the first primary tunnel to a first alternate tunnel.

13. The computer-implemented method of claim 12, wherein the query is from a traffic engineering agent of the tunnel source router, and wherein reporting by the first mid-tunnel router is based on at least the query from the traffic engineering agent of the tunnel source router.

14. The computer-implemented method of claim 12, wherein reporting by the first mid-tunnel router comprises using a routing protocol to send the capacity of the first primary tunnel between the first mid-tunnel router and the first subsequent router of the first primary tunnel.

15. The computer-implemented method of claim 9, further comprising:

continuing to compare the capacity of the first primary tunnel between the first mid-tunnel router and the first subsequent router of the first primary tunnel with the first capacity threshold; and based on at least the capacity of the first primary tunnel between the first mid-tunnel router and the first subsequent router of the first primary tunnel rising above the first capacity threshold, transferring the portion of traffic for the first primary tunnel from the first alternate tunnel back to the first primary tunnel.

16. The computer-implemented method of claim 9, wherein the first primary tunnel further comprises:

a third mid-tunnel router disposed between the first mid-tunnel router and the tunnel destination router;

wherein the first subsequent router of the first primary tunnel comprises the third mid-tunnel router; and wherein the computer-implemented method further comprises:

determining, by the third mid-tunnel router, a capacity of the first primary tunnel between the third mid-tunnel router and a second subsequent router of the first primary tunnel.

17. A non-transitory computer storage device having computer-executable instructions stored thereon, which, on execution by a computer, cause the computer to perform operations comprising:

creating, in a packet switched network, a first primary tunnel comprising:

a tunnel source router, a tunnel destination router, and a first mid-tunnel router disposed between the tunnel source router and the tunnel destination router;

creating, in the packet switched network, a first alternate tunnel comprising:

the tunnel source router, the tunnel destination router, and a second mid-tunnel router disposed between the tunnel source router and the tunnel destination router, wherein the second mid-tunnel router is not within the first primary tunnel;

determining, by the first mid-tunnel router, a capacity of the first primary tunnel between the first mid-tunnel router and a first subsequent router of the first primary tunnel, wherein the first subsequent router of the first primary tunnel is not within the first alternate tunnel;

reporting, by the first mid-tunnel router, the capacity of the first primary tunnel between the first mid-tunnel router and the first subsequent router of the first primary tunnel in response to a query from the tunnel source router of the first primary tunnel;

comparing the capacity of the first primary tunnel between the first mid-tunnel router and the first subsequent router of the first primary tunnel with a first capacity threshold; and based on at least the capacity of the first primary tunnel between the first mid-tunnel router and the first subsequent router of the first primary tunnel dropping below the first capacity threshold, transferring at least a portion of traffic for the first primary tunnel to the first alternate tunnel.

18. The non-transitory computer storage device of claim 17, wherein the operations further comprise:

replacing, in the packet switched network, the first primary tunnel with a second primary tunnel, the second primary tunnel comprising:

the tunnel source router, the tunnel destination router, and a third mid-tunnel router disposed between the tunnel source router and the tunnel destination router;

determining, by the third mid-tunnel router, a capacity of the second primary tunnel between the third mid-tunnel router and a subsequent router of the second primary tunnel; and comparing the capacity of the second primary tunnel between the third mid-tunnel router and the subsequent router of the second primary tunnel with a second capacity threshold.

19. The non-transitory computer storage device of claim 18, wherein the operations further comprise:

determining, by a traffic engineering controller, a route of the first primary tunnel, a route of the first alternate tunnel, and the first capacity threshold;

transmitting, by the traffic engineering controller, to the tunnel source router, at least a first portion of the route of the first primary tunnel, at least a portion of the route of the first alternate tunnel, and the first capacity threshold;

transmitting, by the traffic engineering controller, to the first mid-tunnel router, at least a second portion of the route of the first primary tunnel;

based on a tunnel reconfiguration trigger event, determining, by the traffic engineering controller, a route of the second primary tunnel, a route of a second alternate tunnel, and the second capacity threshold;

transmitting, by the traffic engineering controller, to the tunnel source router, at least a first portion of the route of the second primary tunnel, at least a portion of the route of the second alternate tunnel, and the second capacity threshold; and transmitting, by the traffic engineering controller, to the third mid-tunnel router, at least a second portion of the route of the second primary tunnel and the second capacity threshold.

20. The non-transitory computer storage device of claim 17, wherein the tunnel source router transfers the portion of traffic for the first primary tunnel to the first alternate tunnel.

* * * * *